(12) United States Patent
Wimmer

(10) Patent No.: US 10,374,415 B2
(45) Date of Patent: Aug. 6, 2019

(54) LOAD RESTORATION IN A HIGH OR MEDIUM VOLTAGE SUBSTATION

(71) Applicant: ABB Schweiz AG, Baden (CH)

(72) Inventor: Wolfgang Wimmer, Langenthal (CH)

(73) Assignee: ABB Schweiz AG, Baden (SE)

( * ) Notice: Subject to any disclaimer, the term of this patent is extended or adjusted under 35 U.S.C. 154(b) by 364 days.

(21) Appl. No.: 15/293,960

(22) Filed: Oct. 14, 2016

(65) Prior Publication Data
US 2017/0033553 A1    Feb. 2, 2017

Related U.S. Application Data

(63) Continuation of application No. PCT/EP2015/057379, filed on Apr. 2, 2015.

(30) Foreign Application Priority Data

Apr. 17, 2014  (EP) .................................... 14165203

(51) Int. Cl.
*H02H 7/28*   (2006.01)
*H02H 3/05*   (2006.01)
*H02H 3/06*   (2006.01)

(52) U.S. Cl.
CPC ............... *H02H 7/28* (2013.01); *H02H 3/05* (2013.01); *H02H 3/06* (2013.01); *Y02E 60/723* (2013.01); *Y04S 10/16* (2013.01); *Y04S 10/525* (2013.01)

(58) Field of Classification Search
CPC ............... H02H 7/28; H02H 3/05; H02H 3/06
See application file for complete search history.

(56) References Cited

U.S. PATENT DOCUMENTS 7,154,722 B1 * 12/2006 Stoupis ................... H02H 3/06
                                                                361/62
2008/0225452 A1 *  9/2008 Stoupis ............... H02J 13/0013
                                                                361/62
(Continued)

FOREIGN PATENT DOCUMENTS

CN         103605867 A    2/2014
EP           1819022 A1   8/2007
(Continued)

OTHER PUBLICATIONS

European Patent Office, International Search Report & Written Opinion issued in corresponding Application No. PCT/EP2015/057379, dated Aug. 12, 2015, 9 pp.
(Continued)

*Primary Examiner* — Scott Bauer
(74) *Attorney, Agent, or Firm* — Taft Stettinius & Hollister LLP; J. Bruce Schelkopf

(57) ABSTRACT

The present invention is concerned with simplified configuration as well as supervision and testing of load restoration functions in high or medium voltage substations of electrical power transmission or distribution networks. The invention takes advantage of the fact that all information for load restoration is available from a standardized configuration representation and from dynamically observable events. Specifically, the IEC 61850 Substation Configuration Description (SCD) file includes the substation single line, the bus bar or breaker failure protection functionality related to it, and the way how reclosing commands can be conveyed for the restoration process. A load restore function or load transfer application observes the execution of a protection trip function and the concurrent connection state of the bays to bus bars in order to automatically restore the power flow
(Continued)

across a failed bus bar segment to a parallel healthy bus bar segment.

14 Claims, 1 Drawing Sheet

(56) References Cited

U.S. PATENT DOCUMENTS

| | | | | |
|---|---|---|---|---|
| 2009/0005915 A1* | 1/2009 | Wimmer | ............... | H02H 7/261 700/292 |
| 2009/0112375 A1* | 4/2009 | Popescu | ............... | H02H 7/261 700/292 |
| 2013/0035800 A1* | 2/2013 | Kulathu | ................ | H02J 3/14 700/295 |
| 2014/0074276 A1* | 3/2014 | Libuda | ................ | G05B 15/02 700/112 |
| 2014/0111897 A1* | 4/2014 | He | .................... | H02H 7/26 361/64 |

FOREIGN PATENT DOCUMENTS

| | | |
|---|---|---|
| EP | 2086088 A1 | 2/2008 |
| EP | 2262074 A1 | 12/2010 |
| WO | 03073182 A1 | 9/2003 |
| WO | 2013121077 A1 | 8/2013 |

OTHER PUBLICATIONS

European Patent Office, Extended Search Report issued in corresponding Application No. 14165203.2, dated Jul. 7, 2014, 10 pp.
European Patent Office; Communication pursuant to Article 94(3) EPC dated Feb. 5, 2018; Application No. 14165203.2; Applicant ABB Schweiz AG; 4 pgs.

* cited by examiner

LOAD RESTORATION IN A HIGH OR MEDIUM VOLTAGE SUBSTATION

FIELD OF THE INVENTION

The invention relates to the field of Substation Automation in high or medium voltage substations of electrical power transmission or distribution networks. Specifically, it relates to automated load restoration following a bus bar trip.

BACKGROUND OF THE INVENTION

Substations in high and medium voltage power networks include primary devices such as electrical cables, lines, bus bars, disconnectors, circuit breakers, power transformers and instrument transformers, which are generally arranged in switchyards and/or bays. These primary devices are operated in an automated way via a Substation Automation (SA) system. The SA system comprises secondary devices, among which Intelligent Electronic Devices (IED) responsible for protection, control and monitoring of the primary devices. The secondary devices may be hierarchically assigned to a station level or a bay level of the SA system. IEDs on the bay level, also termed bay units, are connected to each other as well as to the IEDs on the station level via a communication network including an inter-bay or station bus for exchanging commands and status information.

A communication standard for communication between the secondary devices of a substation has been introduced by the International Electrotechnical Committee (IEC) as part of the standard IEC 61850 entitled "communication networks and systems for power utility automation". For non-time critical report messages, section IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet as physical media. For time-critical event-based messages, such as trip commands, IEC 61850-8-1 specifies the Generic Object Oriented Substation Events (GOOSE) directly on the Ethernet link layer of the communication stack. SA systems based on IEC61850 are configured by means of a standardized configuration representation or formal system description called Substation Configuration Description (SCD).

Substation Automation (SA) systems include a number of basic SA functions for protection, control and monitoring of the substation. For functions protecting against a failure of a primary device, like breaker failure protection or bus bar protection, so called protection zones have to be considered. Protection zones are electrically connected parts of the switchyard, which are delimited by open disconnectors and open or closed circuit breakers. Accordingly, the relation between protection zones and switching devices, i.e. the disconnectors and circuit breakers, or their mutual assignment, is dynamically determined from the switchyard topology at single line level and from the present state of all disconnectors.

By way of example, if a bay circuit breaker which is tripped by a line protection function does not open because of an internal failure, a so-called breaker failure protection function is triggered in turn, and a trip signal is propagated to circuit breakers in protection zones adjacent to, i.e. to the left and right of, the failed circuit breaker. In other words, the task of breaker failure protection is to detect that a breaker has failed to clear a fault, and to trip all the remaining breakers feeding into the segment containing the fault in order to clear the fault for good. Likewise, the task of bus bar protection is to detect any fault on the bus bar, and to trip the breakers connected to the affected bus bar.

EP 1819022 A1 aims at minimizing the potential damage caused by the failure of a single central Intelligent Electronic Device (IED) responsible for calculating, assigning and storing information about switchyard zones of a high or medium voltage switchyard. To this end, a distributed switchyard zone management is introduced, comprising a distributed storage of the knowledge about the switchyard zones with assignments of individual switchyard elements or components to the various switchyard zones being stored on several IEDs.

EP 2262074 A1 is concerned with simplified engineering of protection lockout functionality in a Substation Automation (SA) system. Wiring complexity as well as supervision related engineering is replaced by including protection-zone related intelligence into a lockout function block at a breaker IED. The remaining configuration effort consists in assigning lockout function instances to respective protection zones, and in specifying for each protection function which protection-zone(s) it shall trip and reset after lockout. Hence for switchyard configurations and power networks where a protection function trips multiple breakers by using several bay control or protection devices a more efficient implementation of lockout functionality is possible.

For high availability of power in smart grids a fast load restoration, or load transfer, after a protection trip is important, to ensure that loads connected to a tripped, or isolated, bus bar segment are again provided with power without delay. Conventional load restoration systems are coupled to a previous load shedding action which remembers the shed loads, or rely on manual restoration of the loads in priority steps adapted to the available power reserve. Implementations of a fast load restoration after a bus bar trip also benefit from the IEC 61850 standard, which provides the necessary communication to the protection and control units in the switchyard without needing additional hardware wiring. Conventional implementations of load restoration require project, or substation, specific application logic and intensive testing.

DESCRIPTION OF THE INVENTION

It is an objective of the invention to simplify configuration as well as supervision and testing of load restoration functions. This objective is achieved by a method and a device according to the independent claims. Preferred embodiments are evident from the dependent patent claims.

According to the invention, the above objective is achieved by taking full advantage of the fact that all information for load restoration is available from a standardized configuration representation and from dynamically observable events. Specifically, the IEC 61850 Substation Configuration Description (SCD) file includes the substation single line, the bus bar or breaker failure protection functionality related to it, and the way how reclosing commands can be conveyed for the restoration process. A load restore function or load transfer application observes the execution of a protection trip function and the concurrent connection state of the bays to bus bars in order to automatically restore the power flow across a failed bus bar segment to a parallel healthy bus bar segment. If the substation bus bars are normally operated as a ring, such load restoration may even restore the complete power flow across the voltage level. The load restore application function is triggered by the appropriate protection trip signal of a bus bar trip or of a breaker failure trip originating at a bus bar segment or bus bar node. In the following, the term segment is used to designate the part or parts of a bus bar electrically isolated as a consequence of a bus bar trip or of a breaker failure trip.

Specifically, automated load restoration in a substation of a power system with a bus bar connectable, via switching devices, to a plurality of bays, feeders and loads, comprises the following steps in order:

observing, or receiving a message indicative of, a trip command of a bus bar or breaker failure trip electrically isolating a segment of the bus bar, identifying an orphan, isolated or de-energized bay previously, i.e. prior to the trip, connected to the isolated bus bar segment, identifying connecting switching devices electrically arranged between the orphan bay and an un-tripped, live, or energized bus bar segment, and issuing closing commands on behalf of the connecting switching devices to connect the orphan bay to the un-tripped bus bar segment.

In preferred variants of the invention, the identification of the orphan bays is accelerated by executing the following preparatory steps in advance of the tripping event:

establishing, based on a dynamic substation topology of the substation, for each bay a connecting node of the bus bar to which the bay is connected, and identifying an orphan bay with an established connecting node being part of the isolated bus bar segment.

Alternatively, the preparatory steps may comprise establishing, based on a dynamic substation topology, protection zones for the bus bar, and establishing, for each bay a connecting protection zone to which the bay is connected, and identifying the orphan bay with an established connecting protection zone equal to or comprised in the isolated bus bar segment.

In an advantageous embodiment of the invention, the dynamic substation topology is established by reading a standardized configuration description of the SA system, and obtaining there from a static topology representative of at least a part of the substation as well as information about primary elements of the substation, observing, monitoring or receiving network messages indicative of a switch status (open/close) of a switching device of the substation, and updating the dynamic substation topology upon observation of a status change of the switch status.

In other words, pre-configured load restoration scenarios for a limited number of possible protection trips are replaced by a dynamic identification of un-tripped healthy bus bar segments which is only executed once a trip has actually occurred. The load restoration application analyses the concerned bus bar segments to find out which bays need to be transferred from an orphan bus bar segment to a parallel un-tripped bus bar segment. A failure to find such a parallel un-tripped bus bar segment may be indicative of a fault at a coupling circuit breaker, or of a closed disconnector-disconnector connection, between two parallel bus bars, and a corresponding extension of protection zones across segments on both parallel bus bars.

The load restoration application, engineered and instantiated as a Logical Node LN, is capable of self-configuration from an IEC 61850 SCD file, and requires as optional manual input only a few characteristic timing constants. Testing of the application in a simulation environment requires only little engineering effort and may be performed on a generic level with an extended SCD file for a hypothetical substation configuration comprising all possible bay types and a maximum of four bus bars. Project specific testing can likewise be performed offline, and already during development, in a simulation environment with the SCD file of the project.

The present invention also relates to a computer program product including computer program code for controlling one or more processors of a device adapted to be connected to a communication network of a substation automation system and/or configured to store a standardized configuration representation, particularly, a computer program product including a computer readable medium containing therein the computer program code.

BRIEF DESCRIPTION OF THE DRAWINGS

The subject matter of the invention will be explained in more detail in the following text with reference to preferred exemplary embodiments which are illustrated in the attached drawings, in which.

DETAILED DESCRIPTION OF PREFERRED EMBODIMENTS

Figure 1:
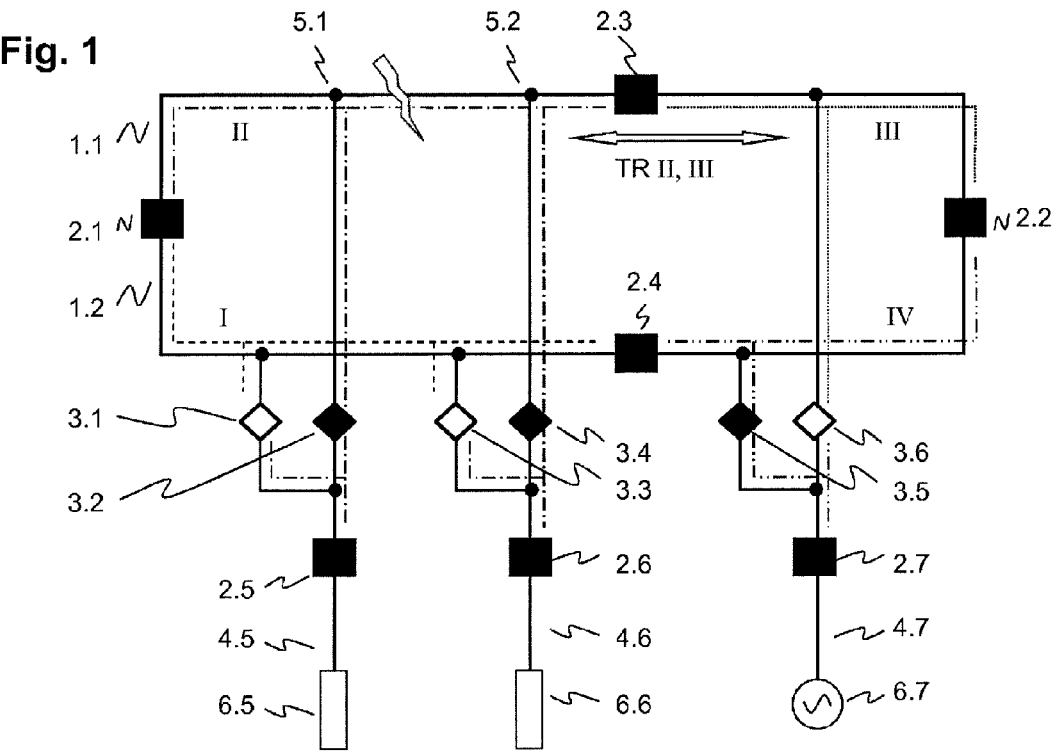
FIG. 1 shows a single-line diagram of a double bus bar before a bus bar trip.

FIG. 1 depicts an electrical single-line diagram of a switchyard with an exemplary double bus bar topology including two parallel bus bars. The diagram comprises items or icons representative of various primary devices, such as bus bars 1, circuit breakers 2, disconnectors 3, line infeed or outgoing conductors 4, nodes 5, and loads or generators 6. Devices of the same kind are distinguished via a continued decimal digit, i.e. 5.1 and 5.2 denote two distinct nodes. Generally, icons representative of open switches (disconnectors and breakers), are shown outlined, whereas switches that are in a closed state are represented as filled icons, for instance, a closed/open disconnector is depicted by a black/white rhomb. Obviously, other topologies are conceivable, and the topologies may comprise other primary devices such as power transformers, generators, earthing isolators and instrument transformers without limiting the applicability of the present invention. In the following, the distinction between the primary devices and their representation by icons or elements in the electrical line diagram on a drawing board, computer screen or other display is neglected. Likewise, message or telegram exchange between elements or primary devices is to be understood as a communication between the respective IEDs of the SA system to which the elements are allocated and by which representations or instances of the primary device-objects are handled.

In detail, the topology depicted comprises two coupling circuit breakers 2.1, 2.2 coupling, or separating, two parallel bus bars 1.1, 1.2, which in turn are divided in two sections by section circuit breakers 2.3, 2.4. Three bays are depicted, each comprising a bay circuit breaker 2.5, 2.6, 2.7 connected via conductors 4.5, 4.6, 4.7 to distant loads 6.5, 6.6 or a generator 6.7. The bay circuit breakers are each connectable to the two bus bars via two disconnectors 3.1, 3.2; 3.3, 3.4 and 3.5, 3.6. As mentioned above, protection zones are electrically connected parts of the switchyard which are delimited by open disconnectors and open or closed circuit breakers. The states of the disconnectors as depicted in FIG.

1 give rise to four protection zones I, II, III, IV as further detailed below, and which are indicated by broken lines of different patterns next to the sections of the bold-type single line diagram. In the exemplary event of a bus bar trip originating at bus bar node 5.1, the section circuit breaker 2.3, coupling circuit breaker 2.1, and the bay circuit breakers 2.5 and 2.6, all belonging to the protection zone II, have to trip or open. Accordingly, the isolated bus bar segment in this case consists of protection zone II. Alternatively, in the event of a breaker failure of section circuit breaker 2.3, the coupling circuit breaker 2.1, 2.2 as well as bay circuit breakers 2.5 and 2.6 belonging to the two protection zones II and III adjacent to the failed circuit breaker, have to trip or open. Accordingly, the isolated bus bar segment now consists of protection zones II and III. Corresponding trip messages are propagated as IEC 61850 GOOSE messages over the substation communication network to the IEDs controlling the respective circuit breakers. As depicted by the block arrow in FIG. 1, the failed section circuit breaker 2.3 sends a telegram TR II III with the breaker failure trigger and the IDs of the concerned zones to all circuit breakers.

Figure 2:
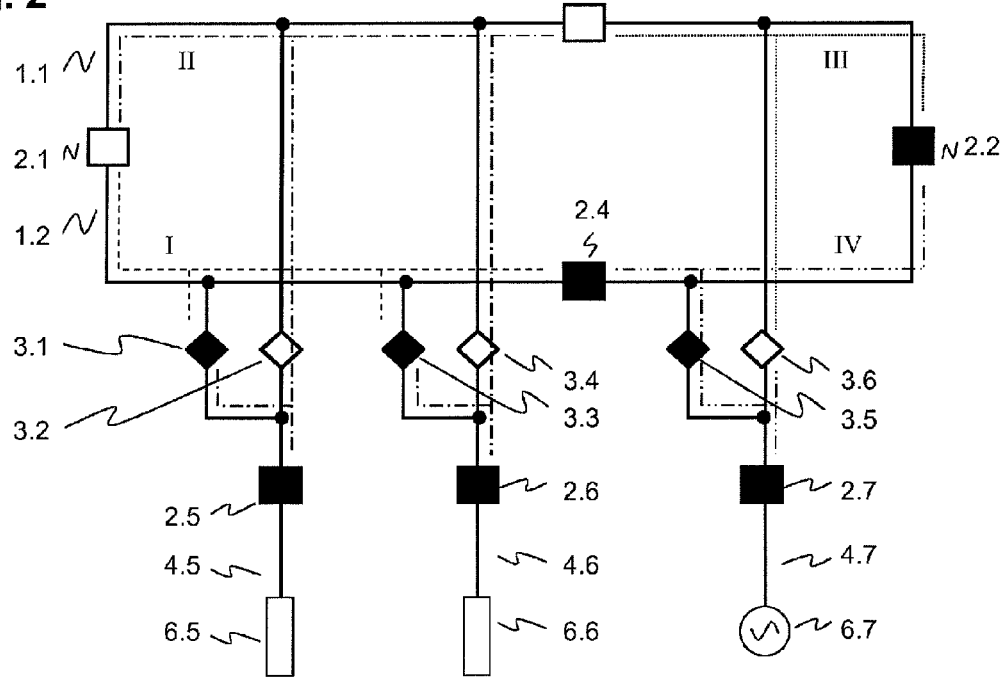
FIG. 2 shows the electrical single-line diagram after load restoration.

FIG. 2 finally depicts the status of the electrical single-line diagram of the switchyard of FIG. 1 following the bus bar trip described above, and after successful load restoration of the loads 6.5 and 6.6 to an un-tripped bus bar segment comprised in original protection zone I.

Following observation of the trip signal or trip message, and after expiry of an optional delay or waiting time as described below, the load restoration function analyses the complete concerned voltage level for open circuit breakers and closed bus bar disconnectors, in order to determine, for every bay, whether the bay is still connected to an un-tripped busbar segment. Bays feeding power 6.7 or connecting loads 6.5, 6.6 that are, or have been, connected to a tripped bus bar segment need to be transferred or reconnected to an un-tripped, energized or parallel bus bar segment that has no electrical connection to the tripped bus bar segment. The load restoration or transfer is generally executed by opening any disconnectors 3.2, 3.4 in the tripped bus bar segment (zone II), closing the disconnectors 3.1, 3.3 between the isolated bays and the identified un-tripped bus bar segment (zone I), and finally closing the bay circuit breakers 2.5, 2.6.

The bays to be transferred may also be identified from messages arriving within a configured delay time window following the trip and confirming actual circuit breaker opening or operation. The length of this time window should be sufficient to ensure reception of all switch status changes during high communication load situations. The identified bays are then handled as mentioned, including identification of a parallel bus bar segment not electrically coupled to the bay, and executing the switching operations (open the still closed disconnector, connect the disconnector to other bus bar segment, close breaker).

A protection function protects some primary object such as a line, a transformer, a circuit breaker, or a bus bar. A fault on the object is cleared by opening all circuit breakers surrounding this object and defining a so-called protection zone. Zones are electrically connected parts of the switchyard, which in general are limited by open disconnectors and open or closed circuit breakers. A zone calculation function as described in EP 1819022 A1 may be used to identify the bays connected to a protection zone or bus bar node. As the bus bar trip does not change the zone identification of the connected bays, it delivers all the information needed to identify the tripped circuit breakers and with this the isolated bays which need to be transferred to a parallel bus bar segment. The zone calculation may be part of the load restoration function and be based on a dynamic switchyard topology determined by the SCD single line and the received switch positions. If a zone trip is issued, the zone identifier belonging to the trip message can directly be used to search for the concerned isolated bays.

The IEC 61850 SCD file contains the description of the single line diagram, and the SA functions implemented on IEDs of the SA system. For each bus bar node there exists a PDIF (Differential Protection) or PDIR (Directional Comparison) LN (Logical Node) sending out the bus bar trip. Similarly a LN RBRF (Breaker Failure) can be identified issuing the breaker failure trip, typically located at the failed circuit breaker. The SCD contains further the relation between the single line diagram and the logical nodes on the IEDs providing the switch states. This allows to identify the isolated bays via the circuit breakers that have been operated by the protection function.

In all cases described above the basic configuration data comes from the SCD file. The application logic works on the functional names and the single line topology, and uses the relation between the single line part of the SCD to the logical nodes on the IEDs to identify the needed signal values for the switch yard state and the protection trips. The signal semantics inside this is identified from the standardized LN class names and data object names in IEC 61850; e.g. a bus bar trip is issued by a logical node PDIF with data object Op, and this is allocated to the bus bar node for which the trip is issued. A breaker failure trip is identified by the OpEx data object from an RBRF logical node, and locally executed trips by its OpIn data object. The concerned busbar segment may be found by analysing the circuit breaker bay allocation of the tripped breakers respective the relation of the RBRF logical nodes to the circuit breakers as described in the SCD file, or from the zone trip information.

Additional configuration information that is not immediately available from the SCD file may be specified manually upon instantiation of the load restoration application Logical Node LN. This includes the delay or waiting time after the initial trip observation that is required to ensure that the entire state subsequent to the trip is available in the load restoration application, including a confirmation that all switching actions related to the trip have successfully completed. The delay time also accounts for additional subsequent actions such as a breaker failure trip e.g. due to a failed circuit breaker not responding to the initial bus bar trip. This time depends on the maximum communication delays under a high communication load during the trip event, as well as the used communication services, and may typically be of the order of 0.5 to 1 seconds.

From a performance point of view, as the load restoration application needs to operate disconnectors with run times of several seconds for a single switching action, the application may use TCP/IP based services. However the application must also be able to handle intervening operator commands that are issued by an operator before all reclosing actions, including slow disconnector movements, have completed consistently. This is simply reached by using the Select-Before-Operate method for the switching operations, which has a connected command reservation mechanism, and skip all bays or one bay (configurable) if a select was not successful or the disconnector is no longer connected to the tripped bus bar segment.

The principles and methods of the invention are by no means restricted to a use in substation automation, but likewise applicable to other process control systems with a standardized configuration description. In particular, it has to be noted that IEC 61850 is also an accepted standard for Hydro power plants, Wind power systems, and Distributed Energy Resources (DER).

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A load restoration method in a substation with a bus bar connectable to a plurality of bays and loads, comprising:
   reading a standardized configuration description of a substation automation system and obtaining therefrom a static topology representative of at least a part of the substation,
   observing a switch status of a switching device of the substation,
   establishing a dynamic substation topology upon observation of a status change of the switch status,
   observing a trip isolating a segment of the bus bar,
   identifying an orphan bay previously connected to the isolated bus bar segment,
   identifying connecting switching devices between the orphan bay and an un-tripped bus bar segment, and
   issuing close commands on behalf of the connecting switching devices to connect the orphan bay to the un-tripped bus bar segment.

2. The method according to claim 1, comprising
   establishing, based on the dynamic substation topology, for each bay a connecting node to which the bay is connected, and
   identifying an orphan bay with a connecting node being part of the isolated bus bar segment.

3. The method according to claim 1, comprising
   establishing, based on the dynamic substation topology, protection zones for the bus bar, and establishing, for each bay a connecting protection zone to which the bay is connected, and
   identifying the orphan bay with a connecting protection zone related to the isolated bus bar segment.

4. The method according to claim 1, comprising, between the steps of observing the trip and identifying the orphan bay, the step of waiting for a delay time of at least 0.5 seconds.

5. The method of claim 1, wherein the un-tripped bus bar segment is different from the isolated segment of the bus bar.

6. The method of claim 1, further comprising
   issuing an open command to a disconnector in the isolated bus bar segment to connect the orphan bay to the un-tripped bus bar segment.

7. The method of claim 6, further comprising
   issuing a close command to a bay circuit breaker of the orphan bay to connect the orphan bay to the un-tripped bus bar segment.

8. An apparatus comprising an Intelligent Electronic Device IED in a substation with a bus bar connectable to a plurality of bays and loads, the IED configured to:
   read a standardized configuration description of a substation automation system and obtain therefrom a static topology representative of at least a part of the substation;
   observe a switch status of a switching device of the substation;
   establish a dynamic substation topology upon observation of a status change of the switch status;
   observe a trip isolating a segment of the bus bar;
   identify an orphan bay previously connected to the isolated bus bar segment;
   identify connecting switching devices between the orphan bay and an un-tripped bus bar segment, and
   issue close commands on behalf of the connecting switching devices to connect the orphan bay to the un-tripped bus bar segment.

9. The apparatus of claim 8, wherein the IED is further configured to:
   establish, based on the dynamic substation topology, for each bay a connecting node to which the bay is connected; and
   identify an orphan bay with a connecting node being part of the isolated bus bar segment.

10. The apparatus of claim 8, wherein the IED is further configured to:
    establish, based on the dynamic substation topology, protection zones for the bus bar;
    establish, for each bay a connecting protection zone to which the bay is connected, and
    identify the orphan bay with a connecting protection zone related to the isolated bus bar segment.

11. The apparatus of claim 8, wherein the IED is further configured to wait for a delay time of at least 0.5 seconds between the observing of the trip and the identifying of the orphan bay.

12. The apparatus of claim 8, wherein the un-tripped bus bar segment is different from the isolated segment of the bus bar.

13. The apparatus of claim 8, wherein the IED is further configured to issue an open command to a disconnector in the isolated bus bar segment to connect the orphan bay to the un-tripped bus bar segment.

14. The method of claim 13, wherein the IED is further configured to issue a close command to a bay circuit breaker of the orphan bay to connect the orphan bay to the un-tripped bus bar segment.

* * * * *